United States Patent [19]

Wilmsen, deceased et al.

[11] 4,043,950

[45] Aug. 23, 1977

[54] PROCESS FOR THE MANUFACTURE OF PLASTIC FOAMS AND FLAME-PROOFING FOAMS CHARACTERIZED BY THE USE OF A CARRIER FOAM

[76] Inventors: Hans Wilmsen, deceased, late of Essen, Germany; by Joerg Michael Wilmsen, sole heir, 243 Alfredstrasse, 4300 Essen, Germany

[21] Appl. No.: 682,254

[22] Filed: May 3, 1976

Related U.S. Application Data

[63] Continuation of Ser. No. 500,722, Aug. 26, 1974, abandoned.

[30] Foreign Application Priority Data

Aug. 27, 1973 Switzerland .................. 12235/73

[51] Int. Cl.$^2$ .................... C08J 9/16; C08L 5/02; C08L 61/24
[52] U.S. Cl. .................... 260/2.5 F; 252/3; 252/350; 252/382; 260/2.5 R; 260/2.5 BB; 260/2.5 AJ; 260/2.5 BE; 260/2.5 FP; 260/17.3; 260/45.7 R; 260/849; 260/851; 428/310; 428/920; 428/921

[58] Field of Search ......... 260/2.5 R, 2.5 BB, 2.5 AJ, 260/2.5 BE, 2.5 FP, 2.5 F

[56] References Cited

U.S. PATENT DOCUMENTS

| | | | |
|---|---|---|---|
| 3,004,934 | 10/1961 | Dosmann et al. | 260/2.5 FP |
| 3,383,338 | 5/1968 | Wells et al. | 260/2.5 FP |
| 3,824,200 | 7/1974 | Matalon | 260/2.5 R |
| 3,832,311 | 8/1974 | Windemuth et al. | 260/2.5 AT |
| 3,839,239 | 10/1974 | Godfried | 260/2.5 EP |
| 3,865,757 | 2/1975 | Wade | 260/2.5 AR |
| 3,979,341 | 9/1976 | Widmann | 260/2.5 F |

*Primary Examiner*—John Kight, III
*Attorney, Agent, or Firm*—Brooks, Haidt, Haffner & Delahunty

[57] ABSTRACT

Process for the preparation of flameproof synthetic resin foams which comprises admixing (a) a furan resin and/or (b) a co-condensate of a furan resin with phenol and/or melamine and/or urea and/or cresol, and/or (c) a polyester, epoxy, polyurethane, acrylic, alkyd, phenoplast or aminoplast resin or a mixture thereof, with a carrier foam of an aqueous and/or aqueous alcoholic synthetic resin prepared with the aid of a foaming agent and compressed gas.

16 Claims, No Drawings

PROCESS FOR THE MANUFACTURE OF PLASTIC FOAMS AND FLAME-PROOFING FOAMS CHARACTERIZED BY THE USE OF A CARRIER FOAM

This is a continuation, of application Ser. No. 500,722, filed, Aug. 26, 1974, now abandoned.

The invention relates to a process for the manufacture of plastic foams and flameproofing foams based on aqueous and/or aqueous-alcoholic synthetic resins, in which the synthetic resin is foamed up by means of foaming agents and compressed gas and is subsequently cured, if appropriate using catalysts and/or reducing agents and/or oxidising agents, and the chemical and/or the mechanical and/or the physical properties of the known foams and/or new foams are improved by new reaction systems and/or additives.

According to the invention this is achieved by a method wherein
a. a furan resin and/or
b. a furan resin co-condensate in which phenol and/or melamine and/or urea and/or cresol are used; and/or
c. a resin which is a polyester, an epoxy resin, a polyurethane, an acrylic resin, an alkyd, a phenoplast resin or an aminoplast, or mixtures thereof are mixed into an already existing carrier foam, and further solid and/or liquid additives are injected and/or atomised and/or foamed and/or mixed into the finished but not yet cured carrier foam in one or more subsequent mixing chambers.

According to the invention, the foaming is effected by means of foaming agents and compressed gas, whilst an after-foaming can take place as a result of additives which react exothermically, splitting off gas.

It is important that the materials for the carrier foam are of such composition as to ensure rapid curing because the carrier foam must take up the other solid and/or liquid materials, which cure or become solid at a later point in time, without the foam structure collapsing.

The strength of the carrier foam increases with increasing densities (for example due to introduction of resin constituents). More rapid setting is achieved, for example, by increasing the amount of the catalyst or by adding resorcinol (in the case of UF resins). The carrier foam can consist of UF resin (UF resin denotes urea-formaldehyde resin), furan resin, alkyd resin, acrylic resin, polyester resin and the like, and their mixtures, and even cement can in certain proportions be added to the carrier foam.

The carrier foam is foamed by means of a foaming agent, for example based on oils and/or fatty acids or salts thereof, and by means of compressed gas. The carrier foam is then wetted with catalysts and the curing or reaction sequences initiated.

Solid and/or liquid additives, which can also be resins or can be inorganic in nature, are injected or atomised into this finished but not yet cured carrier foam, through one or more additional nozzles (for example in the device described in Swiss Pat. Application 4,526/73).

When introducing basic substances, which can interfere with the curing reaction, for example in the case of UF resin, the amount of acid required is several times that required for normal UF foams without such additives. In order again to lower this increased proportion of acid, it is possible to inject, through a further nozzle, materials which in part neutralise the acid component. As a result of the fact that the points of injection are spatially separate, the introduction of the individual additives to be mixed in is furthermore also separated in time.

According to the invention, it is possible to introduce continuously, into the continuously flowing foam, organic and/or inorganic materials as powders and/or solutions and/or dispersions and/or suspensions of polymers and/or monomers and/or softening, plasticising, thickening or stabilising liquids, either individually or as mixtures.

Furthermore, according to the invention, the resins and/or the additives can be caused to undergo polycondensation, polyaddition and/or polymerisation individually or together with the other media added, so that mineral setting reactions and/or hydrolysis and/or hydration and/or organometallic crosslinking takes place and thus new reaction systems and foam systems are obtained.

According to the invention, the preliminary reactions, intermediate reactions and final reactions of the individual reactions grafted onto the carrier foam can be allowed to take place simultaneously or at different times, so that the physical properties of the end product can be determined thereby.

Proportions of resins, mineral additives and the like can be mixed into the first component, provided they do not interfere with the foaming up of the carrier foam or excessively influence the curing reaction.

As the second component, further proportions of the abovementioned additives can be mixed in after a certain interval in space and time. For example, oils or oleic acids cannot always be mixed into the first component (the carrier foam) since they would in most cases interfere with the foaming up.

As a third component it is possible to mix in the last-mentioned materials.

In the case of a combination foam of UF resin and polyester, the polyester can be added as the third component and the accelerator can be mixed in at the same time, whilst the curing agent can be admixed to the first or second component.

Materials, such as sodium hydroxide solution, which lower the high proportion of acid which is necessary initially with some combination foams can only be admixed as the last component.

According to the invention, the additives can be pretreated mechanically and/or chemically and/or by mineral treatments.

Various materials, such as asbestos, china clay, vermiculite, wood flour and cellulose can be pretreated by mineral treatments, for example with waterglass.

Materials such as, for example, asbestos cement, vermiculite or highly disperse silica can also be premixed to form a conjoint component.

According to the invention, it is possible to introduce, as additives, flameproofing substances based on boron, phosphorus, halogen, nitrogen and/or antimony trioxide, asbestos, perlite, vermiculite or highly disperse silica, and also mineral substances, such as sodium silicates, clay, for example kaolin, and the like.

Combination foams of UF, furan resin, polyester, alkyd, acrylic and the like result in an improvement of the structural strength and of the surface character. Furthermore, the closed surface increases the resistance to the influence of water and oxygen (air) and gives an improvement in shrinkage behaviour compared to normal UF foams.

The addition of cement and gypsum substantially increases the flexural strength, tensile strength and compressive strength of the foams according to the invention.

If furan resins are used, the flame resistance is increased substantially. In inflammability tests, a foam (10 l of resin concentrate, 8 l of water, 500 ccs of FH 75 ® [a furan resin from Messrs. Kluser, Wuppertal], 400 ccs of foaming agent, curing agent, 5 l of water, 1-2 l of Sorbo 100 or glycerol, 500 g of sugar and 235 g of PH resin), having a density of approx. 40 kg/cubic meter, is classifiable as "difficult to ignite" according to DIN 4,102, and F 40 at external temperatures of 65° C.

The abovementioned foams had a firm hard layer of carbon after the flame tests. However, it is also possible so to vary this foam that it gives a frothy carbon foam, having an elastic, closed surface, on exposure to the flame. The frothing up of this carbon foam can be up to 200–300%. The amount of fumes evolved, and the rise in temperature, show very advantageous values. The foams do not drip and do not smoulder.

According to the invention it is possible to introduce additives, such as sugars and/or dextrose and/or starch and/or urea and/or monohydric or polyhydric alcohols, especially glycerol, in order to convert the synthetic resin foam into a closed carbon foam which is as resistant as possible to the action of a flame.

According to the invention, oils, oleic acids, tall oils, silicone oils, waxes and/or paraffins (chlorinated paraffin) can be used as additives.

Chlorinated paraffin results in a plasticisation of the foams. Oleic acid improves their behaviour towards water.

According to the invention it is possible, when using the abovementioned additives, to employ a foaming agent which is a sulphonation product of vegetable fats. When using, for example, oils or paraffins, the foaming up of foaming agents based on a salt (such as, for example, Nekal ® of BASF AG, Ludwigshafen, Germany) is considerably interfered with, whilst a sulphonation product of vegetable fats, such as, for example, Texpon ® (Messrs. Henkel, Dusseldorf, Germany) is not interfered with by the abovementioned products.

According to the invention it is possible to use, as further additives for modifying and improving the structural and physical properties of the foam, in solid and/or liquid form, individually or as mixtures: cement, especially alumina cement, gypsum, especially alpha-gypsum, alumina, china clay, calcium carbonate, calcium chloride, aluminium compounds, such as, for example, aluminium phosphates, aluminum silicates, aluminium sulphate, aluminium oxide, aluminium-chromium oxide and other metal oxides such as, for example, those of manganese, magnesium, zirconium, beryllium and titanium, as well as metal powders, graphite, polyvinyl acetate, polyvinyl alcohol, glycol and other monohydric or polyhydric alcohols, glycerol esters, sodium sulphite, acrylamide, lignin, ammonium phosphates, cresol, cellulose, bitumen and the like.

According to the invention, the synthetic resin foams can be used not only as insulating foams but also as flameproofing foams.

There follow some formulations for the manufacture of plastic foams and flameproofing foams according to the invention, but these formulations do not represent any limitation.

The components listed in the examples which follow are mixed separately. The sequence of addition of the individual components is in general in accordance with their numbering. In particular, component 1, in reaction with component 2, forms the carrier foam. The further components are introduced into this carrier foam.

The foaming agent used in the examples was "Texapon" (from Henkel & Cie, Dusseldorf, Germany).

The epoxide resins used were Versadukt 429 ® and Europox 716 BN ® (Messrs. Schering AG, Bergkamen, Germany).

The polyester resin used was a Polygal casting emulsion E 81 (Messrs. Bayer AG, Leverkusen, Germany) or Palatal 6 (BASF AG, Ludwigshafen, Germany).

The furan resin used was Resamin 420 N (Chemische Werke Albert, Wiesbaden, Germany).

Furan resin co-condensates employed were especially those with urea, melamine or phenol, of types FH 75 or FH 200 (Messrs. Kluser, Wuppertal).

The UF resin used was Schaumharz 293 of BASF AG, Ludwigshafen, Germany.

Products from Messrs. Roehm & Haas (Darmstadt, Germany) (Monomer sample 1) were employed as the acrylic resin.

The alkyd resin was Resydrol VWA 3811 (Chemische Werke Albert, Wiesbaden, Germany).

1. UF carrier foam + furan = 140 kg/cubic meter

1st component: 30,000 g of urea-formaldehyde resin, 5,000 g of furan resin co-condensate, 1,000 g of foam powder
2nd component: 8,950 g of phosphoric acid, 4,000 g of resorcinol
3rd component: 25,000 g of furan resin, 25,000 g of UF resin, 21,000 g of cement, 10,000 g of asbestos, 10,000 g of china clay
4the component: 50 g of sodium hydroxide solution
Total: 140,00 g 2. UF carrier foam + alkyd = 80 kg/cubic meter 1st component: 20,000 g of UF resin, 5,000 g of alkyd, 500 g of foam powder
2nd component: 6,500 g of phosphoric acid, 3,000 g of resorcinol
3rd component: 10,000 g of alkyd, 10,000 g of UF resin, 15,000 g of cement, 10,000 g of asbestos
Total: 80,000 g 3. UF carrier foam + acrylic = 18 kg/cubic meter 1st component: 8,000 g of UF resin, 2,000 g of acrylic resin, 200 g of foam powder
2nd component: 720 g of phosphoric acid, 500 g of resorcinol, 250 g of glycerol
3rd component: 2,330 g of chlorinated paraffin, 2,000 g of UF resin, 2,000 g of acrylic
Total: 18,000 g 4. UF carrier foam + epoxide = 25 kg/cubic meter 1st component: 12,000 g of UF resin, 2,000 g of epoxide resin, 200 g of foam powder
2nd component: 1,000 g of phosphoric acid, 1,300 g of glycerol, 500 g of resorcinol
3rd component: 4,000 g of epoxide resin, 4,000 g of UF resin
Total: 25,000 g 5. UF carrier foam + furan = 58 kg/cubic meter 1st component: 12,000 g of UF resin, 400 g of foam powder,
2nd component: 3,600 g of phosphoric acid, 2,000 g of resorcinol
3rd component: 5,000 g of UF resin, 10,000 g of furan resin, 12,000 g of asbestos, 12,000 g of china clay 1,000 g of highly disperse silica
Total: 58,000 g 6. UF carrier foam + furan = 77 kg/cubic meter 1st component: 15,000 g of UF resin, 2,000 g of furan resin, 400 g of foam powder
2nd component: 3,100 g of phosphoric acid, 2,000 g of resorcinol
3rd component: 10,000 g of UF resin, 15,000 g of furan resin, 15,000 g of cement, 1,000 g of aluminum powder, 10,00 g of asbestos
4th component: 3,500 g of Na waterglass
Total: 77,000 g 7. UF carrier foam + furan = 26 kg/cubic meter 1st component: 8,000 g of UF resin, 200 g of foam powder
2nd component: 2,000 g of phosphoric acid, 800 g of glycerol
3rd component: 5,000 g of UF resin, 10,000 g of phenol-furan resin co-condensate
Total: 26,000 g 8. UF carrier foam + furan = 13 kg/cubic meter 1st component: 8,000 g of UF resin, 180 g of foam powder
2nd component: 1,700 g of phosphoric acid, 1,000 g of glycerol
3rd component: 1,000 g of furan resin, 500 g of UF resin, 400 g of dextrin, 120 g of urea
Total: 13,000 g As a result of the numerous possible combinations, a whole range of new foam products of density 5 - 200 kg/cubic meter, or more, is obtained, which products can be used for a wealth of possible applications (we shall merely mention mining, aircraft construction, the cement industry, the timber industry and the steel industry) since they combine a large number of desired and required possibilities and properties in one product:

1. Insulation against cold, heat and sound.
2. Good burning characteristics. For example, according to DIN 4,102 the foam from formulation 7 (but using a urea-furan resin co-condensate instead of the furan resinphenol co-condensate) was classifiable under B 1, F 40 by the Materials Testing Bureau. There was no smouldering and little evolution of smoke, and the flame height was low.
3. The range extends from soft, light, elastic foams to heavy foams which are resistant to pressure and to flexing.

As an example, the synthetic resin foams can be used for cable ducts, to protect these against fire and the permeation of gas.

Gas-tight and/or vapour-tight outer layers and intermediate layers can be produced in combination with the synthetic resin foam, by inserting these layers or by brushing or spraying with suitable materials such as, for example, bitumen latex and/or tar, epoxy resin and the like. The synthetic resin foams can also be used for the insulation of sandwich-type metal doors or wooden doors, or sandwich elements. The synthetic resin foams can be used to encase steel supports and girders, or can be used for sandwich-type outer walls, facades, steel-construction buildings and the like, where the foam simultaneously provides insulation against cold, heat and sound, prevents condensation water and at the same time provides considerable protection against fire. It is also possible to use the foam in producing fireproof partitions in halls or factories.

Finally, the foams produced according to the invention can be employed to manufacture sheets — in conjunction with belt installations — and/or mouldings, or cavities can be filled, or surfaces coated, in situ.

Since the spraying process is a time-saving and wage costs-saving process, the entire process is extremely advantageous from a price point of view.

The invention is not restricted to the illustrative embodiments described, or to the possible applications described, and can instead be modified in various ways within the scope of the inventive concept.

I claim:

1. Process for the manufacture of plastic foams and flameproofing foams based on aqueous and/or aqueous alcoholic synthetic resins, in which the synthetic resin is foamed up by means of foaming agents and compressed gas and is subsequently cured, if appropriate using catalysts and/or reducing agents and/or oxidizing agents, and the chemical and/or the mechanical and/or the physical properties of the known foams and/or new foams are improved by new reaction systems and/or additives, characterised in that a carrier foam of urea-formaldehyde resin or a carrier foam containing urea-formaldehyde resin and at least one member from the group consisting of:
   a. furan resin,
   b. furan resin co-condensate,
   c. polyester resin, epoxy resin polyurethane, acrylic resin, alkyd, phenoplast resin or aminoplast resin, is formed, the carrier foam being rapid curing, and (2) further solid and/or liquid additives are mixed into the finished but not yet cured carrier foam in one or more subsequent mixing chambers.

2. Process according to claim 1, characterised in that after foaming by means of foaming agents and compressed gas, an after-foaming is effected by additives which react exothermically, splitting off gas.

3. Process according to claim 1, characterised in that as organic and/or inorganic materials, powders and/or solutions and/or dispersions and/or suspensions of polymers and/or monomers and/or softening, plasticising, thickening or stabilising liquids, individually or as mixtures, are introduced continuously into the continuously flowing foam.

4. Process according to claim 1, characterised in that the resins and/or the additives, individually or together with the other added media, are caused to undergo polycondensation, polyaddition and/or polymerisation so that mineral setting reactions and/or hydrolysis and/or hydration and/or organo-metallic crosslinking occurs.

5. Process according to claim 1, characterised in that the additives used are flameproofing substances based on boron, phosphorus, halogen, nitrogen and/or antimony trioxide, asbestos, perlite, vermiculite, highly disperse silica and mineral substances, such as sodium silicates and alumina.

6. Process according to claim 1, characterised in that, as additives, sugars and/or dextrose and/or starch and/or ureas and/or monohydric or polyhydric alcohols are added to convert the synthetic resin foam into a frothable, flame-resistant carbon foam.

7. Process according to claim 1, characterised in that oils, oleic acids, tall oils, silicone oils, waxes and/or halogenated or unhalogenated paraffins, or glycerol or sorbitol are used as additives.

8. Process according to claim 7, characterised in that a foaming agent which is a sulphonation product of vegetable fats is used.

9. Process according to claim 1, characterised in that there are used as further additives, in a solid and/or liquid form, individually or as mixtures, to modify and improve the structure and the physical properties of the foam; cement, gypsum, aluminia, china clay, calcium carbonate, calcium chloride, aluminium compounds, aluminium phosphates, aluminium silicates, aluminium sulphate, aluminium oxide, aluminium-chromium oxide, metal oxides of manganese, magnesium, zirconium, beryllium and titanium, metal powders, graphite, polyvinyl acetate, polyvinyl alcohol, glycol and other monohydric or polyhydric alcohols, glycerol esters, sodium sulphite, acrylamide, lignin, ammonium phosphates, cersol, cellulose, and bitumen.

10. Use of the foams obtained by the process of claim 1, as insulating foams and/or as flameproofing foams.

11. Use of the foams obtained by the process of claim 1 for cable ducts to protect them against fire and gas permeation.

12. Use of the foams obtained by the process of claim 1 as gas-tight and/or vapourtight outer layers and intermediate layers which are produced by introduction of, or brushing or spraying with bitumen latex, tar, or epoxy resin.

13. Use of the foams obtained by the process of claim 1 for insulating sandwich-type metal doors or wooden doors, or sandwich elements.

14. Use of the foams obtained by the process of claim 1 as a casing for steel supports and girders.

15. Use of the foams obtained by the process of claim 1 for sandwich-type outer walls, facades and steelconstruction buildings.

16. Use of the foams obtained by the process of claim 1 for the production of fireproof partitions.

UNITED STATES PATENT AND TRADEMARK OFFICE
CERTIFICATE OF CORRECTION

PATENT NO. : 4,043,950

DATED : August 23, 1977

INVENTOR(S) : HANS WILMSEN, Deceased, by JOERG MICHAEL WILMSEN, sole heir

It is certified that error appears in the above-identified patent and that said Letters Patent are hereby corrected as shown below:

Col. 4, line 39, "4the" should read --4th-- line 40, "140,00 g" should read --140,000--

Col. 5, line 19, --10,00 g-- should read --10,000 g--

Signed and Sealed this

Twentieth Day of December 1977

[SEAL]

Attest:

RUTH C. MASON
Attesting Officer

LUTRELLE F. PARKER
Acting Commissioner of Patents and Trademarks